(12) United States Patent
Bullock (10) Patent No.: US 8,760,853 B1
(45) Date of Patent: Jun. 24, 2014

(54) RACKING CONTACTOR

(75) Inventor: Scott A. Bullock, Bristol, VA (US)

(73) Assignee: Electro-Mechanical Corporation, Bristol, VA (US)

( * ) Notice: Subject to any disclaimer, the term of this patent is extended or adjusted under 35 U.S.C. 154(b) by 371 days.

(21) Appl. No.: 13/414,287

(22) Filed: Mar. 7, 2012

Related U.S. Application Data (60) Provisional application No. 61/451,407, filed on Mar. 10, 2011.

(51) Int. Cl.
*H02B 11/00* (2006.01)
*H02B 11/12* (2006.01)
*H01R 13/62* (2006.01)
*H01H 9/00* (2006.01)

(52) U.S. Cl.
USPC ........... 361/607; 361/608; 361/609; 361/615; 200/50.21; 439/310

(58) Field of Classification Search
None
See application file for complete search history.

(56) References Cited

U.S. PATENT DOCUMENTS

| | | | |
|---|---|---|---|
| 4,090,230 A | 5/1978 | Fuller et al. | |
| 4,427,854 A | 1/1984 | Kleinecke et al. | |
| 4,447,858 A | 5/1984 | Farag et al. | |
| 4,482,936 A | 11/1984 | Saito | |
| 5,097,382 A | 3/1992 | Leach et al. | |
| 7,118,281 B2 * | 10/2006 | Chiu et al. | 385/53 |
| 7,277,294 B2 | 10/2007 | Carlson | |
| 7,450,364 B2 * | 11/2008 | Parker et al. | 361/220 |
| 7,789,690 B1 * | 9/2010 | Rhein | 439/310 |
| 7,791,865 B2 * | 9/2010 | Wirtzberger et al. | 361/679.01 |
| 7,821,775 B2 | 10/2010 | Narayanasamy et al. | |
| 8,085,527 B2 * | 12/2011 | Naumann et al. | 361/609 |
| 8,203,851 B2 * | 6/2012 | Boetzer | 361/801 |
| 8,283,585 B2 * | 10/2012 | Capelli | 200/50.23 |
| 2013/0206554 A1 * | 8/2013 | Darko et al. | 200/50.21 |

\* cited by examiner

*Primary Examiner* — Boris Chervinsky
(74) *Attorney, Agent, or Firm* — The Van Winkle Law Firm; Steven C. Schnedler (57) ABSTRACT

A disconnect mechanism, an electrical component assembly including the disconnect mechanism, and an electrical circuit protector in turn including the electrical component assembly. The disconnect mechanism includes a carriage, as well as a switch actuator connected to the carriage for moving the carriage between a switch-closed position and a switch-open position. A contactor is mounted to the carriage so as to move with the carriage, the contactor including first and second contactor terminals and providing selective electrical connection between the contactor terminals. A movable disconnect switch contact is connected to the first contactor terminal, and is movable with the carriage and the contactor. A fixed disconnect switch contact is positioned for selective engagement with the movable disconnect switch contact as the carriage moves to the switch-closed position.

20 Claims, 11 Drawing Sheets

RACKING CONTACTOR

CROSS-REFERENCE TO RELATED APPLICATIONS

The benefit of U.S. provisional patent application Ser. No. 61/451,407, filed Mar. 10, 2011, and titled "Racking Contactor" is claimed, the entire disclosure of which is hereby expressly incorporated by reference.

This is a companion to concurrently-filed U.S. patent application Ser. No. 13/414,250, filed Mar. 7, 2012, titled "Draw Out Control Compartment," which in turn claims the benefit of U.S. provisional patent application Ser. No. 61/451,390, filed Mar. 10, 2011; and to concurrently-filed U.S. patent application Ser. No. 13/414,327, filed Mar. 7, 2012, titled "Illumination and Visual Indicator," which in turn claims the benefit of U.S. provisional patent application Ser. No. 61/451,416, filed Mar. 10, 2011; the entire disclosures of which are hereby expressly incorporated by reference.

BACKGROUND OF THE INVENTION

The invention relates generally to electrical circuit protectors, such as electrical feeder circuit protectors including an electrical contactor circuit for power distribution centers employed in underground mining activities. (However, embodiments of the invention are not limited to that environment or context.) More particularly, the invention relates to apparatus which includes a contactor as well as a disconnect/grounding switch.

Carlson U.S. Pat. No. 7,277,294 titled "Contactor Draw Out Tray," the entire disclosure of which is hereby expressly incorporated by reference, discloses electrical circuit protector apparatus which has a stationary frame and a movable frame. The stationary frame is housed within a power distribution center and has input terminals for incoming electrical power, and output terminals for delivering electrical power to equipment operating on a feeder circuit, for example equipment in the form of a mining machine including an electric motor. The movable frame is drawer-like and includes a slide-out support tray having a front panel, and may be referred to as a draw out tray. The movable frame or draw out tray carries what may broadly be described as electrical components for the electrical circuit protector, including a disconnect/grounding switch, a contactor and a controller. A particular example of electrical components for the electrical circuit protector is a motor starter. The disconnect/grounding switch is part of a mechanism which mechanically locks the movable frame relative to the stationary frame, and in particular ensures that the disconnect switch is open and the output conductors are grounded before the movable frame is drawn out of the stationary frame.

In the motor starter apparatus disclosed in Carlson U.S. Pat. No. 7,277,294, the contactor is a Jennings Vacuum contactor Model MVC77. The manually-operated disconnect/grounding switch more particularly is a knife blade disconnect/grounding switch manufactured by Line Power, a Division of Electro-Mechanical Corporation, assignee of Carlson U.S. Pat. No. 7,277,294 and of this patent document.

SUMMARY OF THE INVENTION

In one aspect, a disconnect mechanism is provided. The disconnect mechanism includes a carriage, as well as a switch actuator connected to the carriage for moving the carriage between a switch-closed position and a switch-open position. A contactor is mounted to the carriage so as to move with the carriage, the contactor including first and second contactor terminals and providing selective electrical connection between the contactor terminals. A movable disconnect switch contact is connected to the first contactor terminal, and is movable with the carriage and the contactor. A fixed disconnect switch contact is positioned for selective engagement with the movable disconnect switch contact as the carriage moves to the switch-closed position.

In another aspect, an electrical component assembly is provided. The electrical component assembly has first and second main component assembly terminal. The assembly includes a carriage, and a switch actuator connected to the carriage for moving the carriage between a switch-closed position and a switch-open position. A contactor is mounted to the carriage so as to move with the carriage, the contactor including first and second contactor terminals and providing selective electrical connection between the contactor terminals. A movable disconnect switch contact is connected to the first contactor terminal and movable with the carriage and the contactor. A fixed disconnect switch contact is electrically connected to the first main component assembly terminal and is positioned for selective engagement with the movable disconnect switch contact as the carriage moves to the switch-closed position. A flexible conductor electrically connects the second contactor terminal and the second main component assembly terminal.

In yet another aspect, an electrical circuit protector is provided. The electrical circuit protector includes a stationary frame supporting at least one main input connector assembly and at least one main output connector assembly. A drawer-like movable frame is slidably carried on the stationary frame and supports at least one drawer input connector assembly and at least one drawer output connector assembly positioned for respective mating engagement with the at least one main input connector assembly and the at least one main output connector assembly upon selective movement of the movable frame along the stationary frame. A disconnect mechanism mounted to the movable frame includes a carriage, and a switch actuator connected to the carriage for moving the carriage between a switch-closed position and a switch-open position. A contactor is mounted to the carriage so as to move with the carriage, the contactor including first and second contactor terminals and providing selective electrical connection between the contactor terminals. A movable disconnect switch contact is connected to the first contactor terminal and is movable with the carriage and the contactor. A fixed disconnect switch contact is electrically connected to the at least one drawer input connector assembly and is positioned for selective engagement with the movable disconnect switch contact as the carriage moves to the switch-closed position. A flexible conductor electrically connects the second contactor terminal and the at least one drawer output connector assembly.

BRIEF DESCRIPTION OF THE DRAWINGS

FIG. 11A is a view from the right front (in the same orientation of and configuration as FIG. 9)

FIG. 12A is a view generally from the right front (corresponding to the orientation of and configuration as FIG. 10)

DETAILED DESCRIPTION

Figure 1:
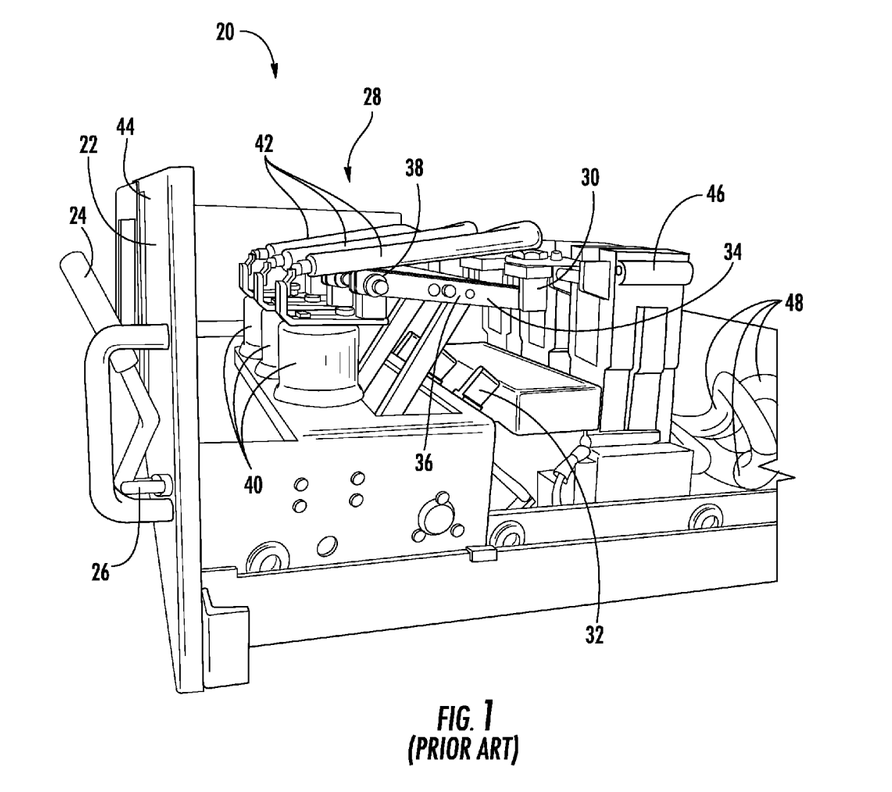
FIG. 1 is a three-dimensional view illustrating a prior art commercial embodiment of an apparatus corresponding to Carlson U.S. Pat. No. 7,277,294, showing the knife blade disconnect/grounding switch in its CLOSED or OPERATING position.
Figure 2:
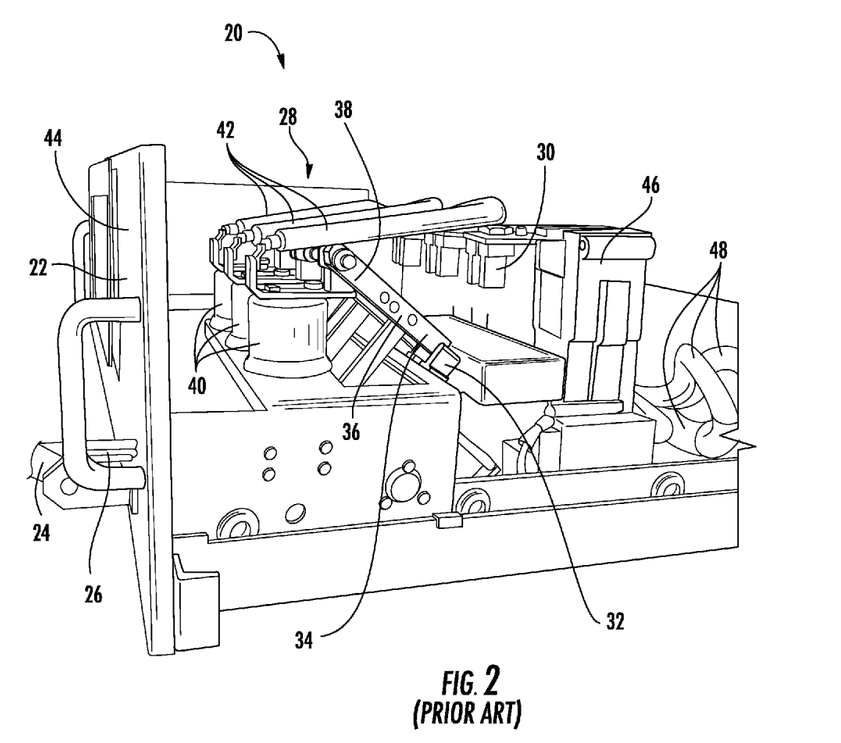
FIG. 2 illustrates the prior art apparatus of FIG. 1, but showing the knife blade disconnect/grounding switch in its DISCONNECTED and GROUNDED position.

Referring first to FIGS. 1 and 2, a prior art drawer-like movable frame 20 or draw out tray 20 corresponding to the movable frame as disclosed in the above-incorporated Carlson U.S. Pat. No. 7,277,294 is illustrated. The drawer-like movable frame 20 includes a front panel 22 with a lever-like disconnect/grounding switch handle 24 connected to a horizontal linkage arm 26 for operating a visible disconnect/ grounding switch 28. (Although the existence of the handle 24 implies that the switch 28 is manually-operated, the visible disconnect/grounding switch may as well be operated by a motor.)

In FIG. 1, the switch handle 24 is in its generally vertical up position, and the visible disconnect/grounding switch 28 is in its CLOSED or OPERATING position. In FIG. 2, the switch handle 24, although only partly visible, is in its generally horizontal position, and the visible disconnect/grounding switch 28 is in its DISCONNECTED and GROUNDED position.

The visible disconnect/grounding switch 28 is located behind the panel 22 and has fixed power contacts 30 and fixed grounding contacts 32, as well as movable contacts 34 on electrically-conducting pivot arms 36. The pivot arms 36 have pivot ends 38 supported on insulators 40 and are electrically connected to output conductors 42. Significantly in the context of the subject invention, the visible disconnect/grounding switch 28 of the prior art apparatus is a discrete element and is fixed to the drawer-like movable frame 20.

For safety purposes, to facilitate visual assurance that the contacts 30, 34 are in fact open and the contacts 32, 34 are made for grounding when the switch handle 24 is operated to disconnect the circuit (in other words, to provide visual assurance that no mechanical failure has occurred), a viewing window 44 is provided in the front panel 22 for observing operation of the visible disconnect/grounding switch 28.

Also fixed to the frame 20 is a contactor 46, and the fixed power contacts 30 of the switch 28 are attached to the contactor 46. Input conductors 48 are connected to the opposite side of the contactor 46.

In the particular prior art apparatus of FIGS. 1 and 2, the contactor 46 is a Jennings Vacuum contactor Model MVC77; and the disconnect/grounding switch 28 is a knife blade disconnect/grounding switch manufactured by Line Power, a Division of Electro-Mechanical Corporation, assignee of Carlson U.S. Pat. No. 7,277,294 and of this application.

In the configuration of FIG. 1 the knife blade disconnect/ ground switch 28 is in its CLOSED or OPERATING position, with the handle 24 pivoted up essentially parallel to the panel 22 and the linkage arm 26 pushed in. Contacts 30, 34 are made. In the configuration of FIG. 2 the knife blade disconnect/grounding switch 28 is in its DISCONNECTED and GROUNDED position, with the handle 24 pivoted down and the linkage arm 26 pulled out. Fixed power contacts 30 are disconnected, and the movable contacts 34 are connected to the fixed grounding contacts 32, as may be observed through the window 44.

Thus, FIGS. 1 and 2 illustrate an example of prior art apparatus which includes a contactor 46 as well as a disconnect/grounding switch 28, the operation of which can be visually observed. The contactor 46 and the visible disconnect/grounding switch 28 are separate elements.

The subject invention is also embodied in apparatus which includes a contactor as well as a manually-operated disconnect/grounding switch, the operation of which can be visually observed. However, in overview, in embodiments of the invention, a disconnect mechanism 50 integrates a contactor 52 and switch contacts, collectively referred to as switch contacts 54, into what is herein termed a racking contactor 56.

As a result, compared to the prior art apparatus of FIGS. 1 and 2, parts count is reduced, as well as cost. Physical size is also reduced compared to the prior art apparatus, an important consideration in mining applications where compact equipment is desirable.

Although the racking contactor 56 embodying the invention is described and illustrated herein in the context of a contactor draw out tray such as is disclosed in Carlson U.S.

Pat. No. 7,277,294, racking contactors 56 embodying the invention are not limited to that particular environment.

Figure 3:
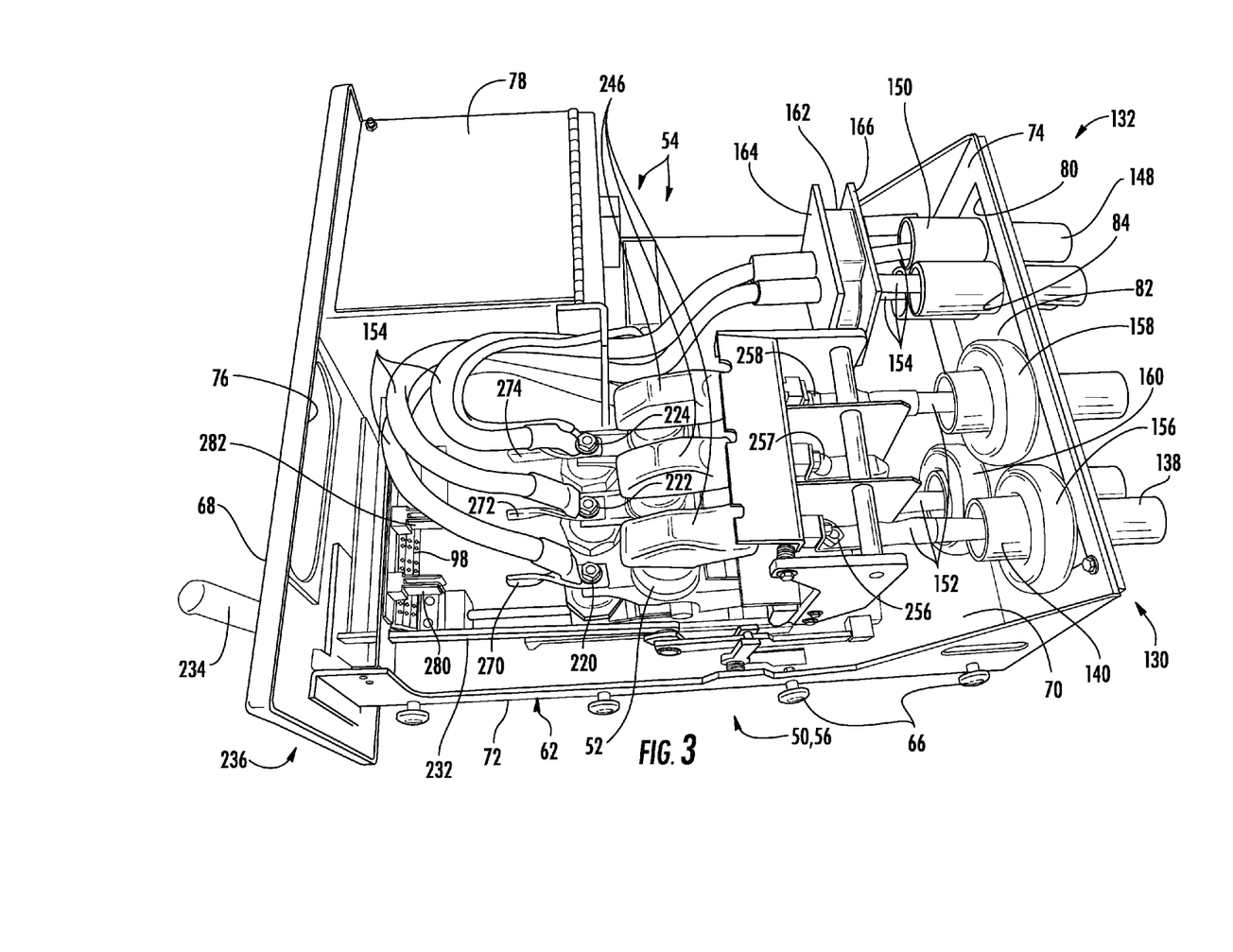
FIG. 3 is a three-dimensional view, generally from the upper right, of a drawer-like movable frame portion of a three-phase electrical circuit protector embodying the invention (also referred to herein as an electrical component assembly), in particular illustrating flexible input and output conductors or wires (which, to avoid the obscuring effect of these conductors, are omitted from the remaining drawing FIGURES, except portions of the conductors are shown in FIG. 5)
Figure 4:
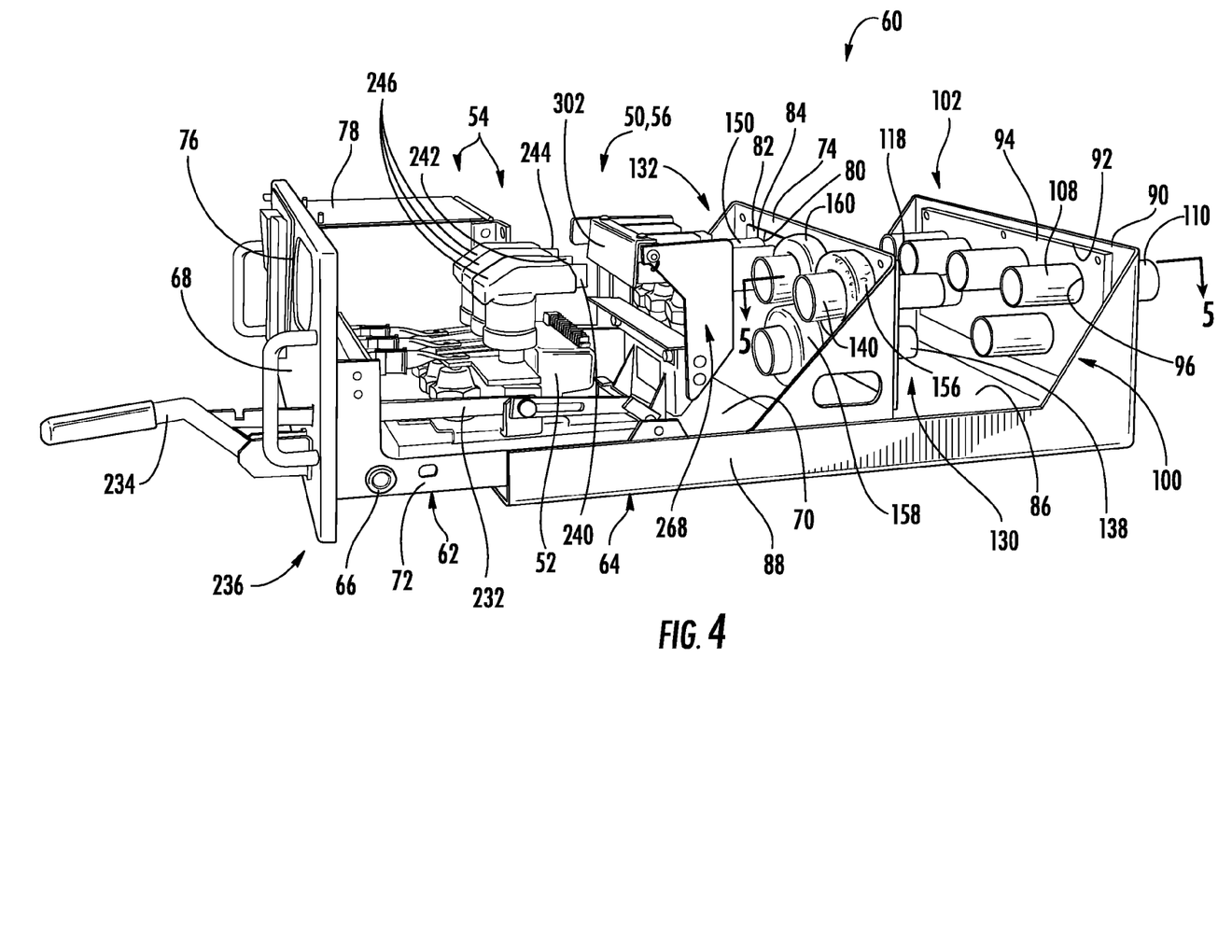
FIG. 4 is a three-dimensional view, generally from the front right side, of a three-phase electrical circuit protector embodying the invention including, in addition to the drawer-like movable frame (electrical component assembly) or drawer of FIG. 3, a stationary frame, with the drawer-like movable frame partially drawn out of the stationary frame.
Figure 5:
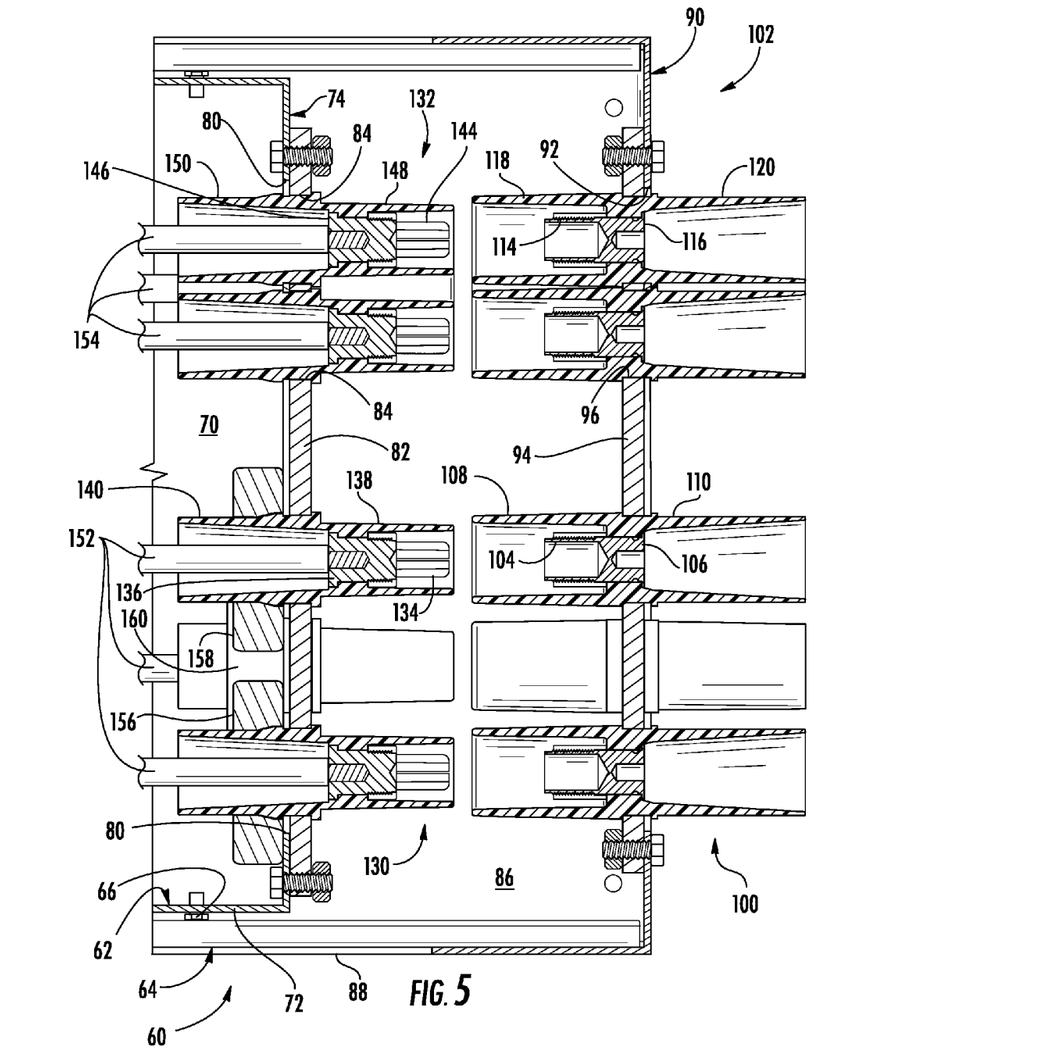
FIG. 5 is a top plan view taken on line 5-5 of FIG. 4 of a portion of the electrical circuit protector, with portions of the connector assemblies broken away.

With reference to FIGS. 3, 4 and 5, an electrical circuit protector 60 embodying the invention includes a drawer-like movable frame generally designated 62 slidably received in a stationary frame 64 (the stationary frame 64 is shown in FIGS. 4 and 5, but not in FIG. 3), generally as disclosed in Carlson U.S. Pat. No. 7,277,294. Rollers 66 facilitate the drawer-like movable frame 62 sliding in and out of the stationary frame 64. FIGS. 4 and 5 show a configuration where the drawer-like movable frame 62 is partially drawn out of the stationary frame 64. By way of example and not limitation, the electrical circuit protector 60 is rated 300 amperes at 5 kV.

The drawer-like movable frame 62, which is also referred to herein as an electrical component assembly 62, more particularly has a front panel 68, a bottom 70, side rails 72, and a rear structure 74. The front panel 68 includes a viewing window aperture 76, representing and also referred to herein as an actual viewing window 76. Thus, the actual transparent material of the viewing window 76 is not specifically illustrated. A control compartment 78 is supported by the front panel 68, as is described in greater detail in the above-incorporated companion application Ser. No. 13/414,250, filed Mar. 7, 2012, titled "Draw Out Control Compartment." The drawer rear structure 74 has a rectangular aperture 80 covered by an attached drawer connector support panel 82 made of phenolic material, in turn having circular drawer connector apertures 84.

The stationary frame has a bottom 86, side rails 88, and a rear structure 90. The rear structure 90 has a rectangular aperture 92 covered by an attached main connector support panel 94 made of phenolic material, in turn having circular main connector apertures 96.

The electrical circuit protector 60 of FIG. 4 (including the drawer-like movable frame portion 62 or electrical component assembly 62 of FIG. 3) is similar in overall configuration and function to the prior art apparatus of FIGS. 1 and 2 corresponding to the above-incorporated Carlson U.S. Pat. No. 7,277,294, but has several differences. A significant difference is that the electrical feeder circuit protector 60 embodying the invention includes the racking contactor 56. As another difference, included in the electrical circuit protector 60, and partly visible in FIG. 3, is an illumination lamp assembly 98. The illumination lamp assembly 98 is described in greater detail in the above-incorporated companion application Ser. No. 13/414,327, filed Mar. 7, 2012, titled "Illumination and Visual Indicator."

Included are three main input connector assemblies 100 and three main output connector assemblies 102, which take the form of feed-through connectors passing through the main connector apertures 96 in the main connector support panel 94 attached to the rear structure 90 of the stationary frame 64.

With particular reference to FIG. 5, each of the main input connector assemblies 100 includes a connector contact socket 104 generally inside the connector support panel 94, and a wire terminal 106 generally on the outside of the connector support panel 94 to which an external input power conductor (not shown) is soldered, in a conventional manner. The wire terminal 106 typically includes an axial hole drilled in the end of the terminal to receive the power conductor. Electrically insulating sleeves 108 and 110 are provided around the connector contact socket 104 and the wire terminal 106, respectively.

The main output connector assemblies 102 are essentially identical, each including a connector contact socket 114 and a wire terminal 116 to which an external power output conductor (not shown) is connected by soldering in a conventional manner. The wire terminal 116 typically includes an axial hole drilled in the end of the terminal to receive the power conductor. Insulating sleeves 118 and 120 surround the connector contact socket 114 and the wire terminal 116, respectively.

The input power conductors (not shown) connected to the terminals 106 receive electrical power inputs to the electrical circuit protector 60 from a power distribution system or center (not shown). The output conductors (not shown) connected to the terminals 116 supply a load, by way of example and not limitation, an electric motor.

Correspondingly, on the rear structure 74 of the drawer-like movable frame 62 are drawer input connector assemblies 130 and drawer output connector assemblies 132 positioned for respective self-aligning mating engagement with the main input connector assemblies 100 and the main output connector assemblies 102. The drawer input and output connector assemblies 130 and 132 likewise are feed-through connectors, passing through the drawer connector apertures 84 in the drawer connector support panel 82 of the drawer-like movable frame 62.

Still referring to FIG. 5, each of the drawer input connector assemblies 130 includes a connector contact pin 134 and a wire terminal 136, which is also referred to herein as a first main component assembly terminal 136. Insulating sleeves 138 and 140 surround the connector contact pin 134 and the wire terminal 136.

Similarly, each drawer output connector assembly 132 includes a connector contact pin 144 and a wire terminal 146, also referred to herein as a second main component assembly terminal 146. Insulating sleeves 148 and 150 surround the connector contact pin 144 and the wire terminal 146.

Figures 9, 10:
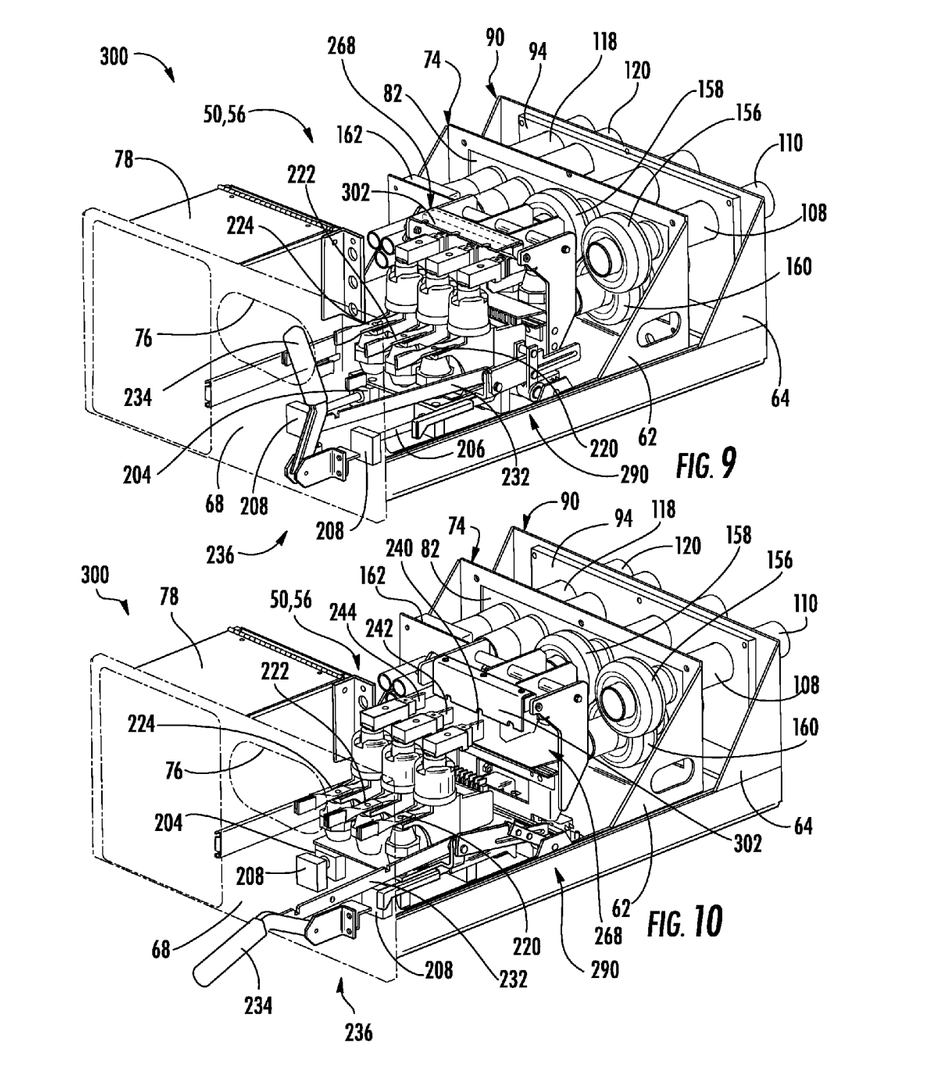
FIG. 9 is a three-dimensional view, generally from the right front, of a second particular embodiment of an electrical circuit protector embodying the invention, with the visible disconnect switch portion thereof embodied as a racking contactor shown in its CLOSED or OPERATING position or configuration.
FIG. 10 is a view in the same orientation as FIG. 9 of the second particular embodiment of an electrical circuit protector embodying the invention, with the visible disconnect switch portion thereof embodied as a racking contactor in its DISCONNECTED and GROUNDED position or configuration.
Figure 11A:
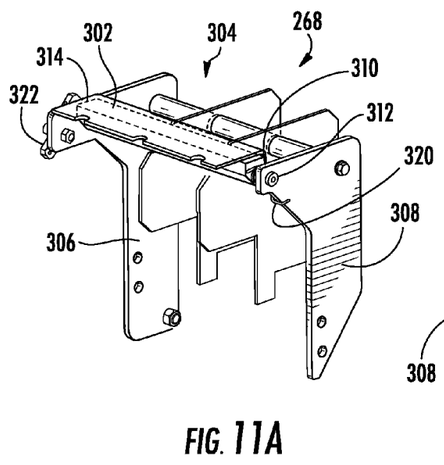
Figure 11B:
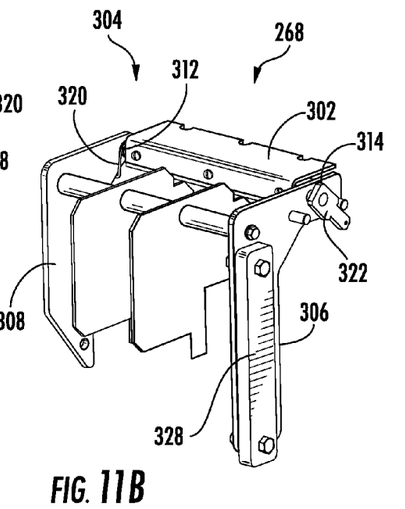
FIG. 11B is a view from the left rear, of a shutter assembly embodied in the electrical circuit protector of FIG. 9, with a barrier pivoted out of the way in the switch-closed position.
Figure 12A:
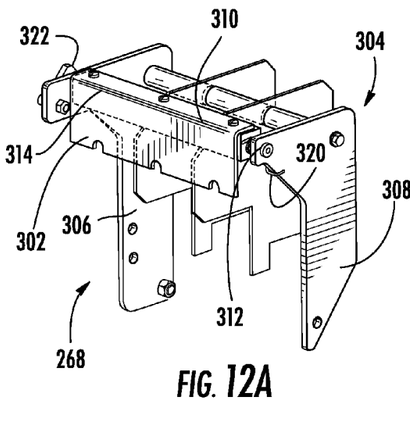
Figure 12B:
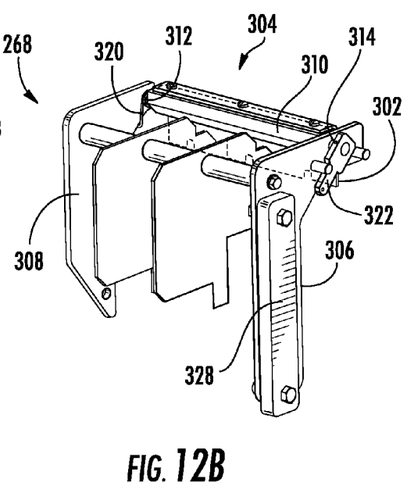
FIG. 12B is a view generally from the left rear, of the shutter assembly, with the barrier pivoted down in between disconnect switch contacts in the switch-open position.
Figure 13:
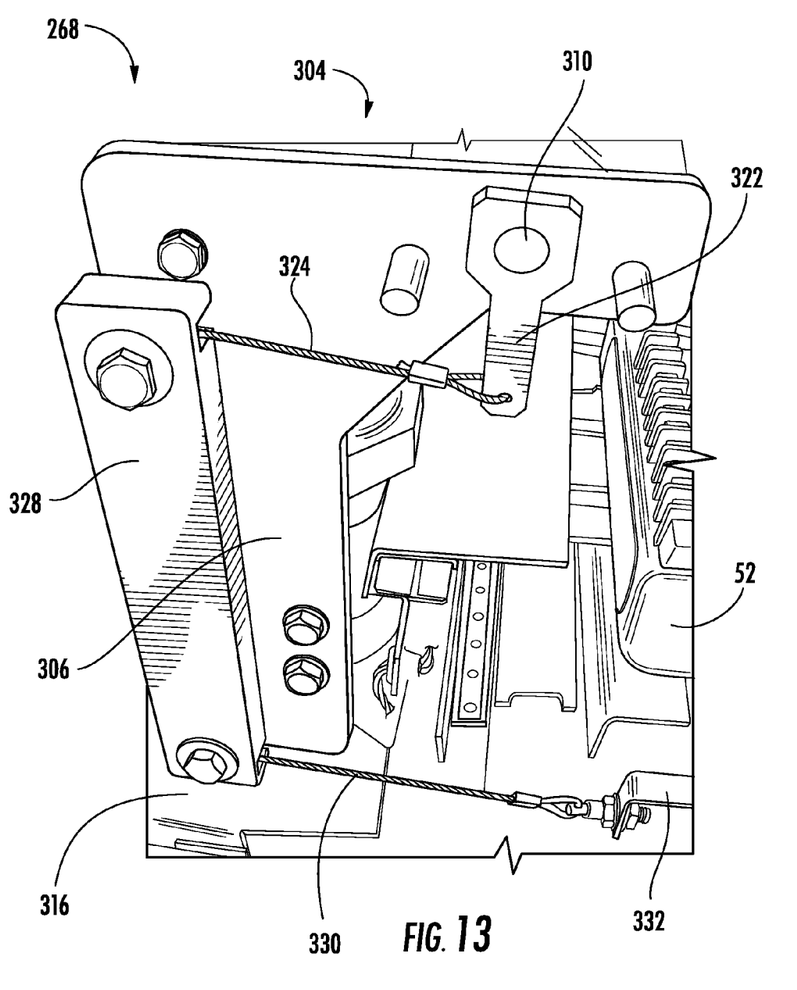
FIG. 13 is a three-dimensional view of a mechanical linkage, generally from the left side (also visible in FIGS. 11B and 12B), connected for pivoting the barrier of FIGS. 11A, 11B, 12A and 12B.

In the configuration of FIGS. 4 and 5, the drawer-like movable frame 62 or electrical component assembly 62 is pulled part way out from the stationary frame 64, and the drawer input and output connector assemblies 130 and 132 are disconnected from the main input and output connector assemblies 100 and 102. In the configuration of FIG. 9 (described in greater detail hereinbelow), the drawer-like movable frame 62 or electrical component assembly 62 is pushed all the way in to the stationary frame 64, and the drawer input and output connector assemblies 130 and 132 engage the main input and output connector assemblies 100 and 102. More particularly, the connector contact pins 134 and 144 connect to the connector contact sockets 104 and 114, while tapered surfaces on the insulating sleeves 138 and 148 cooperating with tapered surfaces on the insulating sleeves 110 and 120 facilitate alignment.

With particular reference to FIG. 3, input power conductors 152 (partly visible in FIG. 5) electrically connect the drawer input connector assemblies 130, more particularly the wire terminals 136 or first main component assembly terminals 136, to the disconnect mechanism 50 as described in greater detail hereinbelow. Output power conductors 154, which are flexible to accommodate movement of the racking contactor 56 of the disconnect mechanism 50, electrically connect the disconnect mechanism 50 to the drawer output connector assemblies 132, more particularly to the wire terminals 146 or second main component assembly terminals 146. The wire terminals 136 and 146 for example include respective axial holes drilled in the ends of the terminals 136 and 146 to receive the conductors 152 and 154. Connections of the input power conductors 152 to the wire terminals 136 of the drawer input connector assemblies 130 and connections of the flexible output power conductors 154 to the wire terminals 146 of the drawer output connector assemblies 132 are accomplished by soldering.

For sensing current through the input power conductors 152, individual current transformers 156, 158 and 160 are provided, one for each of the three phases. The current transformers 156, 158 and 160 for convenience are mounted over the insulating sleeves 140 of the drawer input connector assemblies 130 through which the input power conductors 152 pass. Outputs (not shown) of the current transformers 156, 158 and 160 are connected as sensor inputs to electrical control circuitry (not shown) within the control compartment 78. For sensing possible current imbalance between the three phases, e.g. due to a ground fault, all three output power conductors 154 pass through another current transformer 162. To stably position the output power conductors 154, the current transformer 162 is sandwiched between a pair of electrically-insulating plates 164 and 166 having guide apertures for the conductors 154. An output (not shown) of the current transformer 162 likewise is connected as a sensor input to the electrical control circuitry (not shown) within the control compartment 78.

Figure 6:
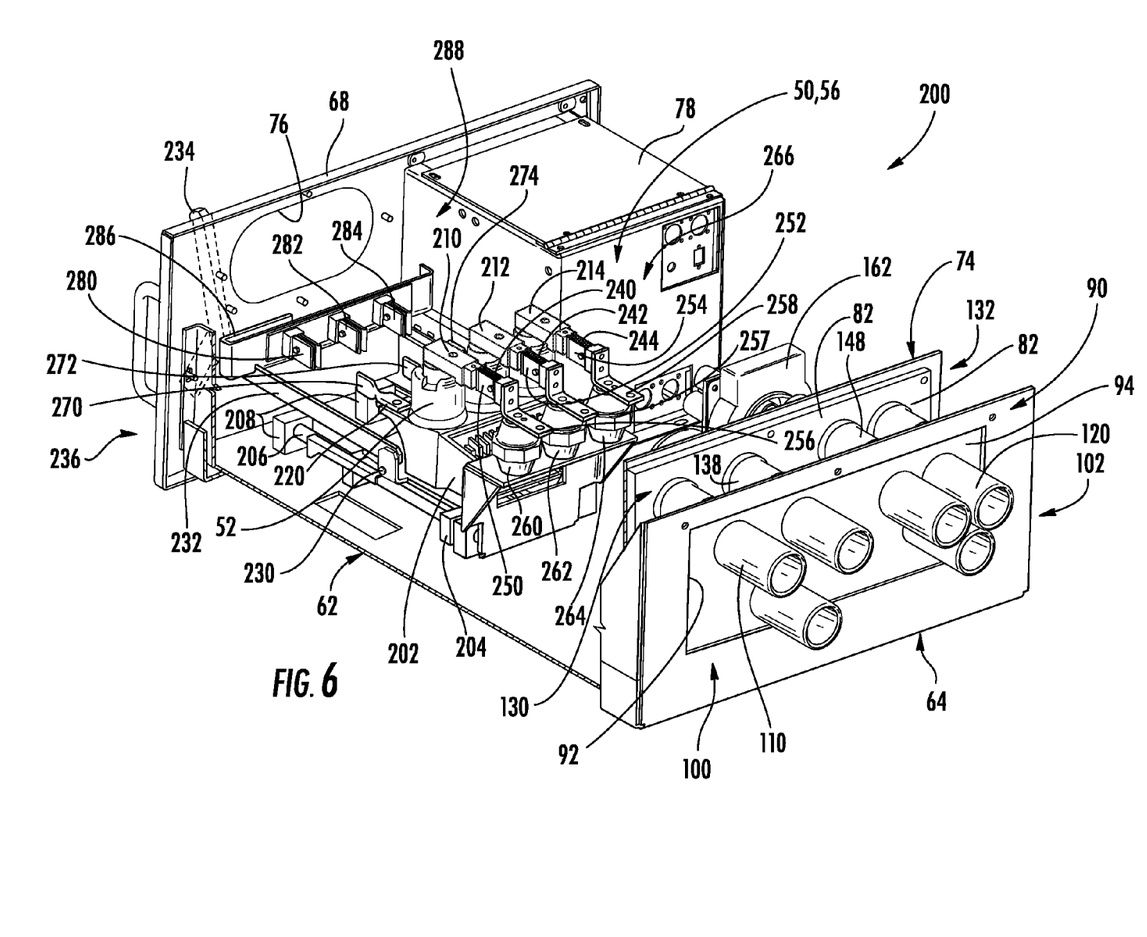
FIG. 6 is a three-dimensional view, generally from the right rear, of a first particular embodiment of an electrical circuit protector embodying the invention, with a visible disconnect switch portion thereof embodied as a racking contactor shown in its CLOSED or OPERATING position or configuration.
Figure 7:
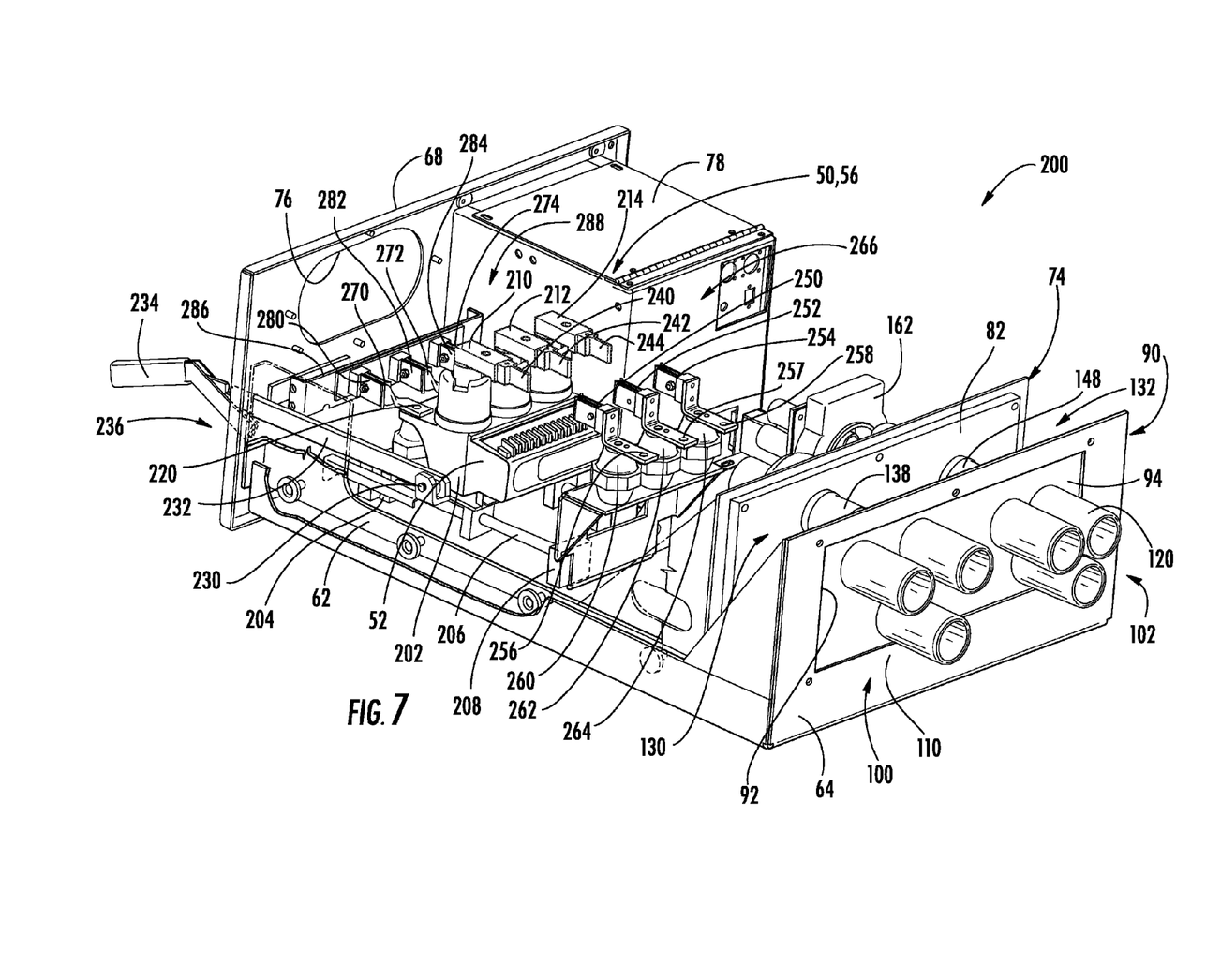
FIG. 7 is a view in the same orientation as FIG. 6, of the first particular embodiment, but with the visible disconnect switch portion thereof embodied as the racking contactor shown in its DISCONNECTED and GROUNDED position or configuration.

FIGS. 6 and 7 illustrate a first particular embodiment 200 of an electrical circuit protector 200 embodying the invention. The electrical circuit protector 200 includes the drawer-like movable frame 62 (also referred to herein as the electrical component assembly 62) and the stationary frame 64 as described hereinabove with reference to FIGS. 3-5. The disconnect mechanism 50 or, more particularly, the racking contactor 56, is attached to and carried by the drawer-like movable frame 62. For clarity of illustration, the input 152 and output 154 power conductors are omitted from FIGS. 6 and 7, although included in the actual circuit protector 200.

Figure 8:
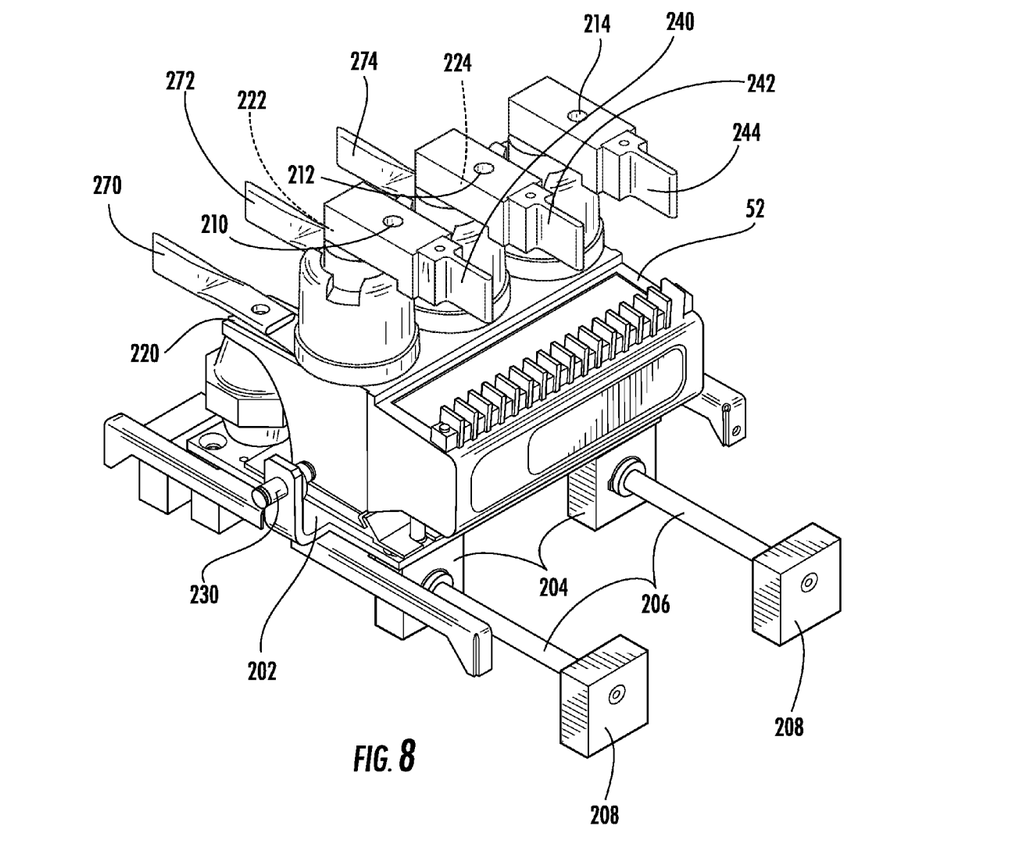
FIG. 8 is a three-dimensional view illustrating a carriage and a linear bearing for the carriage.

Referring to FIG. 8 in addition to FIGS. 6 and 7, the racking contactor 56 more particularly includes a carriage 202 including linear bearings 204 which slide on cylindrical rails 206. The cylindrical rails 206 have mounts 208 attached to the drawer-like movable frame 62. Accordingly, the carriage 202 can move forward (towards the front panel 68) and back (towards the rear structure 74) in a linear translation motion with reference to the drawer-like movable frame 62.

The configuration illustrated in FIG. 6, a position of the carriage 202 all the way back, away from the front panel 68 and towards the rear structure 74, is the switch-closed position. The configuration illustrated in FIG. 7, a position of the carriage 202 all the way forward, towards the front panel 68, is the switch-open position.

The contactor 52 is mounted to the carriage 202, and moves with the carriage 202, unlike the contactor 46 of the prior art apparatus of FIGS. 1 and 2, which is fixed to the movable frame 22. The illustrated contactor 52 is a three-phase contactor. Alternatively, three single-phase contactors may be mounted to the carriage 202. As yet another alternative, the invention may be embodied in a single-phase disconnect mechanism (not shown) including a single-phase contactor (not shown).

The contactor 52 has a set of three first contactor terminals 210, 212 and 214 and a set of three second contactor terminals 220, 222 and 224. During operation, as activated by the electrical control circuitry (not shown) within the control compartment 78, the contactor 52 provides selective electrical connection between the first contactor terminals 210, 212 and 214 and the second contactor terminals 220, 222 and 224, respectively, in a conventional manner. In the illustrated embodiment, the contactor 52 is a Joslyn Clark VC77 series vacuum contactor.

Attached to the side of the carriage 202 is a post 230 to which a horizontal linkage arm 232 is connected for effecting movement of the carriage 202.

More particularly, for effecting translation of the carriage 202, the horizontal linkage arm 232 is connected to a disconnect/grounding switch handle 234 mounted to the front panel 68. The switch handle 234 and the linkage arm 232 together may be viewed as a switch actuator 236. The disconnect/grounding switch handle 234 of embodiments of the invention is essentially identical to the disconnect/grounding switch handle 24 of the prior art apparatus described hereinabove with reference to FIGS. 1 and 2, and serves a similar overall function, that is, to operate a disconnect/grounding switch.

In the configuration illustrated in FIG. 6, the disconnect/grounding switch handle 234 is pivoted up essentially parallel to the panel 68, the linkage arm 232 is pushed in, the carriage 202 is moved to its full rear position (away from the front panel 68), the switch-closed position, and the disconnect/grounding switch of the disconnect mechanism 50 is in its CLOSED or OPERATING position, as described in greater detail hereinbelow.

In the configuration illustrated in FIG. 7, the disconnect/grounding switch handle 234 is pivoted down and out, the horizontal linkage arm 232 is pulled out, the carriage 202 is moved to its full forward position (closest to the front panel 68), the switch-open position, and the disconnect/grounding switch of the disconnect mechanism 50 is in its DISCONNECTED AND GROUNDED position, again as described hereinbelow in greater detail hereinbelow.

As noted hereinabove, the disconnect mechanism 50 integrates the contactor 52, along with switch contacts 54, into what is herein referred to as the racking contactor 56. The racking contactor accordingly integrates the function of the contactor 52 with the function of a visible disconnect/grounding switch including the switch contacts collectively designated 54.

The switch contacts 54 more particularly include movable disconnect switch contacts 240, 242 and 244 connected and attached to the first contactor terminals 210, 212 and 214, respectively, and accordingly are movable with the carriage 202 and the contactor 52. (Electrically-insulating boots 246 shown in FIGS. 3 and 4 over part of the structures of contacts 240, 242, 244 for clarity of illustration are omitted from FIGS. 6, 7 and 8.) In addition, the switch contacts 54 more particularly include fixed disconnect switch contacts 250, 252 and 254 having terminals 256, 257 and 258 mounted on insulators 260, 262 and 264 attached to the structure of the drawer-like movable frame 62. The fixed 250, 252, 254 and movable 240, 242, 244 disconnect switch contacts are positioned for respective selective engagement as the carriage 202 moves to the switch-closed position of FIG. 6. The movable disconnect switch contacts 240, 242, 244 and the fixed disconnect switch contacts 250, 252, 254 are also referred to herein collectively as a disconnect switch contact set 266.

Referring in addition to FIG. 3 (which additionally includes a shutter assembly 268 not included in the embodiment 200 of FIGS. 6 and 7, but described hereinbelow with reference to FIGS. 9, 10, 11A, 11B, 12A, 12B and 13), to complete an electrical circuit, the input power conductors 152 electrically connect the wire terminals 136 of the drawer input connector assemblies 130, also referred to herein as the first main component assembly terminals 136, to the fixed disconnect switch contacts 250, 252 and 254 via the terminals 256, 257 and 258. The flexible output power conductors 154 electrically connect the second contactor terminals 220, 222 and 224 to the wire terminals 146 of the drawer output connector assemblies 132, also referred to herein as the second main component assembly terminals 146. The output power conductors 154 are flexible in order to accommodate movement of the carriage 202 and contactor 52 of the racking contactor 56.

The switch contacts 54 in addition more particularly include movable grounding switch contacts 270, 272 and 274 connected and attached to the second contactor terminals 220, 222 and 224, respectively, and accordingly are movable with the carriage 202 and the contactor 52. In addition, the switch contacts 54 more particularly include fixed grounding switch contacts 280, 282 and 284 electrically connected to a ground reference point 286. The fixed 280, 282 and 284 and movable 270, 272 and 274 grounding switch contacts are positioned for respective selective engagement as the carriage 202 moves to the switch-open position of FIG. 7. Accordingly, in the switch-open position of FIG. 7, the flexible output power conductors 154 (also connected to the second contactor terminals 220, 222 and 224) are grounded. The movable grounding switch contacts 270, 272, 274 and the fixed grounding switch contacts 280, 282, 284 are also referred to herein as a grounding switch contact set 288.

During operation, when the disconnect/grounding switch handle 234 is pulled forward and down, the configuration illustrated in FIG. 7, the carriage 202 is moved all the way forward to the switch-open position, the disconnect switch contact set 266 is open (disconnected), and the grounding switch contact set 288 is made, grounding and shorting the output conductors 154 and accordingly the output terminals 146 together.

In the DISCONNECTED and GROUNDED position of FIG. 7, it is important that the grounding and disconnection be visually observable through the viewing window 76. In the electrical circuit protector 200 embodying the invention, such visibility is provided.

When the disconnect/grounding switch handle 234 is pivoted up essentially parallel to the panel 68, the configuration illustrated in FIG. 6, the carriage 202 is moved all the way to the rear to the switch-closed position, opening the grounding switch contact set 288, and closing the disconnect switch contact set 266, establishing the CLOSED or OPERATING position. In that configuration, current flow between the terminals 136 of the drawer input connector assemblies 130 and the terminals 146 of the drawer output connector assemblies 132 is controlled by the contactor 52 in a conventional manner, as directed by the electrical control circuitry (not shown) within the control compartment 78.

Although not fully illustrated and described herein, the electrical circuit protector 200 includes various mechanical and electrical interlocks. Briefly, any initial movement of the handle 234 to open the disconnect switch contact set 266 automatically causes the contactor 52 to disconnect (if contacts within the contactor 52 are closed), thus ensuring that any load break occurs within the contactor 52. Movement of the drawer-like movable frame 62 either in or out of the stationary frame 64 is prevented unless the disconnect switch contact set 266 is open. One such mechanical interlock is generally designated 290 in FIGS. 9 and 10.

Thus, FIGS. 9 and 10 illustrate a second particular embodiment 300 of an electrical circuit protector 300 embodying the invention. (FIG. 9 includes the drawer-like movable frame 62 illustrated in FIG. 3, and in the same configuration, except that in FIG. 9 the input 152 and output 154 power conductors are omitted for clarity of illustration.) FIG. 9, like FIG. 6, illustrates the switch-closed position of the carriage 202, also referred to as the CLOSED or OPERATING position. FIG. 10, like FIG. 7, illustrates the switch-open position of the carriage 202, also referred to as the DISCONNECTED and GROUNDED position. The electrical circuit protector 300 of FIGS. 9 and 10 differs from the electrical circuit protector 200 of FIGS. 6 and 7 in that the circuit protector 300 includes the shutter assembly 268. FIGS. 11A, 11B, 12A, 12B and 13 illustrate the shutter assembly 268 in greater detail. The shutter assembly 268 as illustrated in FIGS. 9 and 10 obscures various details of the disconnect mechanism 50 embodied as the racking contactor 56. Nevertheless, the disconnect mechanism embodied as the racking contactor 56 in the embodiment 300 of FIGS. 9 and 10 is essentially identical to the disconnect mechanism 50 including the racking contactor 56 in the embodiment 200 of FIGS. 6 and 7, and accordingly is not further described herein.

The shutter assembly 268 includes an electrically-insulating barrier 302, made of transparent plastic, which moves, by pivoting, between the fixed disconnect switch contacts 250, 252 and 254 and the movable disconnect switch contacts 240, 242 and 244 as the carriage 202 moves to the switch-open position of FIG. 9.

The shutter assembly 268 additionally includes a support 304 having left and right sides 306 and 308 which, in the illustrated embodiment, are fixed to the structure of the drawer-like movable frame 62. The barrier 302 is attached to an axle 310 which is in turn pivotably attached to the support 304 at pivot bearings 312 and 314. A mechanical linkage, generally designated 316, is connected for pivoting the barrier 302 into position between the movable 240, 242 and 244 and fixed 250, 252 and 254 disconnect switch contacts as the carriage 202 moves to the switch-open position (FIGS. 10, 12A and 12B), and for pivoting the barrier 302 out of position between the movable 240, 242 and 244 and fixed 250, 252 and 254 disconnect switch contacts, as the carriage 202 moves to the switch-closed position of FIGS. 9, 11A and 11B.

The shutter assembly 268 includes a spring 320 for biasing the barrier 302 out of position between the movable 240, 242 and 244 and fixed 250, 252 and 254 disconnect switch contacts. The mechanical linkage 316 more particularly includes a lever arm 322 connected to an end of the axle 310 of the barrier 302 adjacent the left side 306 of the support 304, and a pull cord 324 having one end 326 connected to operate the lever arm 322. A guide 328 for the pull cord 324 is attached to the left side 306 of the support 304. The pull cord 324 passes through the guide 328, and the other end 330 of the pull cord 324 is attached to a bracket 332 which in turn is attached to the carriage 202 such that, as the carriage 202 moves to the switch-open position (FIGS. 10, 12A and 12B), the cord 324 is pulled so as to pivot the lever arm 322, the axle 310 and the barrier 302 against the force of the spring 320. The pull cord 324 may take the form of a stranded steel cable.

Advantages of one particular electrical circuit protector embodying the subject racking contactor 56 include:

1) Greatly reduced overall parts count. (Number of electrical moving parts reduced from fifteen to six; number of electrical bolted connections reduced from thirty-nine to twenty-one; number of mechanical moving joints reduced from eleven to seven.)

2) Fewer parts and adjustments leads to improved reliability.

3) Reduced manufacturing (assembly) time.

4) Reduced total cost.

5) Total overall volume of assembly reduced by 32%.

6) Weight of assembly reduced by at least 25%.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A disconnect mechanism comprising:
   a carriage, and a switch actuator connected to said carriage for moving said carriage between a switch-closed position and a switch-open position;
   a contactor mounted to said carriage so as to move with said carriage, said contactor including first and second contactor terminals and providing selective electrical connection between said contactor terminals;
   a movable disconnect switch contact connected to said first contactor terminal and movable with said carriage and said contactor; and
   a fixed disconnect switch contact positioned for selective engagement with said movable disconnect switch contact as said carriage moves to the switch-closed position.

2. The disconnect mechanism of claim 1, which further comprises:
   a movable grounding switch contact connected to said second contactor terminal and movable with said carriage and said contactor; and
   a fixed grounding switch contact electrically connected to a ground reference point and positioned for selective engagement with said movable grounding switch contact as said carriage moves to the switch-open position.

3. The disconnect mechanism of claim 1, which comprises a three-phase disconnect mechanism and includes:
   either a three-phase contactor or three individual single-phase contactors mounted to said carriage; and
   three sets of movable disconnect switch and fixed disconnect switch contacts.

4. The disconnect mechanism of claim 2, which comprises a three-phase disconnect mechanism and includes:
   either a three-phase contactor or three individual single-phase contactors mounted to said carriage;
   three sets of movable disconnect switch and fixed disconnect switch contacts; and
   three sets of movable grounding switch and fixed grounding switch contacts.

5. The disconnect mechanism of claim 1, which further comprises a shutter assembly including an electrically insulating barrier which moves into position between said movable and fixed disconnect switch contacts as said carriage moves to the switch-open position.

6. The disconnect mechanism of claim 5, wherein said shutter assembly comprises:
   a support, said barrier being pivotably attached to said support; and
   a mechanical linkage connected for pivoting said barrier into position between said movable and fixed disconnect switch contacts as said carriage moves to the switch-open position, and for pivoting said barrier out of position between said movable and fixed disconnect switch contacts as said carriage moves to the switch-closed position.

7. The disconnect mechanism of claim 6, wherein said shutter assembly further comprises:
   a spring for biasing said barrier out of position between said movable and fixed disconnect switch contacts; and
   wherein said mechanical linkage comprises:
   a lever arm connected for pivoting said barrier, and
   a pull cord having one end connected to said lever arm and another end connected to said carriage such that, as said carriage moves to the switch-open position said cord is pulled so as to pivot said lever arm and said barrier.

8. The disconnect mechanism of claim 2, which further comprises a shutter assembly including an electrically insulating barrier which moves into position between said movable and fixed disconnect switch contacts as said carriage moves to the switch-open position.

9. The disconnect mechanism of claim 8, wherein said shutter assembly comprises:
   a support, said barrier being pivotably attached to said support; and
   a mechanical linkage connected for pivoting said barrier into position between said movable and fixed disconnect switch contacts as said carriage moves to the switch-open position, and for pivoting said barrier out of position between said movable and fixed disconnect switch contacts as said carriage moves to the switch-closed position.

10. The disconnect mechanism of claim 9, wherein said shutter assembly further comprises:
    a spring for biasing said barrier out of position between said movable and fixed disconnect switch contacts; and
    wherein said mechanical linkage comprises:
    a lever arm connected for pivoting said barrier, and
    a pull cord having one end connected to said lever arm and another end connected to said carriage such that, as said carriage moves to the switch-open position said cord is pulled so as to pivot said lever arm and said barrier.

11. An electrical component assembly having first and second main component assembly terminals, said component assembly comprising:
    a carriage, and a switch actuator connected to said carriage for moving said carriage between a switch-closed position and a switch-open position;
    a contactor mounted to said carriage so as to move with said carriage, said contactor including first and second contactor terminals and providing selective electrical connection between said contactor terminals;
    a movable disconnect switch contact connected to said first contactor terminal and movable with said carriage and said contactor;
    a fixed disconnect switch contact electrically connected to said first main component assembly terminal and positioned for selective engagement with said movable disconnect switch contact as said carriage moves to the switch-closed position; and
    a flexible conductor electrically connecting said second contactor terminal and said second main component assembly terminal.

12. The electrical component assembly of claim 11, which further comprises:
    a movable grounding switch contact connected to said second contactor terminal and movable with said carriage and said contactor; and
    a fixed grounding switch contact electrically connected to a ground reference point and positioned for selective engagement with said movable grounding switch contact as said carriage moves to the switch-open position.

13. The electrical component assembly of claim 11, which further comprises a shutter assembly including an electrically insulating barrier which moves into position between said movable and fixed disconnect switch contacts as said carriage moves to the switch-open position.

14. The electrical component assembly of claim 12, which further comprises a shutter assembly including an electrically insulating barrier which moves into position between said movable and fixed disconnect switch contacts as said carriage moves to the switch-open position.

15. The component assembly of claim 11, which further comprises a viewing window for visually observing said position of said carriage and of said movable disconnect switch contact.

16. The component assembly of claim 12, which further comprises a viewing window for visually observing said position of said carriage and of said movable disconnect switch contact.

17. An electrical circuit protector comprising:
a stationary frame supporting at least one main input connector assembly and at least one main output connector assembly;
a drawer-like movable frame slidably carried on said stationary frame and supporting at least one drawer input connector assembly and at least one drawer output connector assembly positioned for respective mating engagement with said at least one main input connector assembly and said at least one main output connector assembly upon selective movement of said movable frame along said stationary frame; and
a disconnect mechanism mounted to said movable frame, said disconnect mechanism including
a carriage, and a switch actuator connected to said carriage for moving said carriage between a switch-closed position and a switch-open position,
a contactor mounted to said carriage so as to move with said carriage, said contactor including first and second contactor terminals and providing selective electrical connection between said contactor terminals,
a movable disconnect switch contact connected to said first contactor terminal and movable with said carriage and said contactor,
a fixed disconnect switch contact electrically connected to said at least one drawer input connector assembly and positioned for selective engagement with said movable disconnect switch contact as said carriage moves to the switch-closed position, and
a flexible conductor electrically connecting said second contactor terminal and said at least one drawer output connector assembly.

18. The electrical circuit protector of claim 17, which further comprises:
a movable grounding switch contact connected to said second contactor terminal and movable with said carriage and said contactor; and
a fixed grounding switch contact electrically connected to a ground reference point and positioned for selective engagement with said movable grounding switch contact as said carriage moves to the switch-open position.

19. The electrical circuit protector of claim 17, which further comprises a shutter assembly including an electrically insulating barrier which moves into position between said movable and fixed disconnect switch contacts as said carriage moves to the switch-open position.

20. The electrical circuit protector of claim 18, which further comprises a shutter assembly including an electrically insulating barrier which moves into position between said movable and fixed disconnect switch contacts as said carriage moves to the switch-open position.

\* \* \* \* \*